US010928838B2

(12) United States Patent
Zhou et al.

(10) Patent No.: US 10,928,838 B2
(45) Date of Patent: Feb. 23, 2021

(54) METHOD AND DEVICE OF DETERMINING POSITION OF TARGET, TRACKING DEVICE AND TRACKING SYSTEM

(71) Applicant: SZ DJI TECHNOLOGY CO., LTD., Shenzhen (CN)

(72) Inventors: You Zhou, Shenzhen (CN); Jiaqi Yan, Shenzhen (CN); Honghui Zhang, Shenzhen (CN); Cong Zhao, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 290 days.

(21) Appl. No.: 15/922,023

(22) Filed: Mar. 15, 2018

(65) Prior Publication Data

US 2018/0203467 A1    Jul. 19, 2018

Related U.S. Application Data

(63) Continuation of application No. PCT/CN2015/100257, filed on Dec. 31, 2015.

(30) Foreign Application Priority Data

Sep. 15, 2015  (WO) ................ PCT/CN2015/089594

(51) Int. Cl.
*H04N 5/232* (2006.01)
*G01S 3/786* (2006.01)
(Continued)

(52) U.S. Cl.
CPC ........... *G05D 1/106* (2019.05); *B64C 39/024* (2013.01); *G01S 3/7864* (2013.01);
(Continued)

(58) Field of Classification Search
None
See application file for complete search history.

(56) References Cited

U.S. PATENT DOCUMENTS 8,448,858 B1    5/2013  Kundu et al.
8,902,233 B1   12/2014  Shen et al.
(Continued)

FOREIGN PATENT DOCUMENTS

CN         1617170 A    5/2005
CN       101252687 A    8/2008
(Continued)

OTHER PUBLICATIONS

Theodorakopoulos, Panagiotis, and Simon Lacroix. "A strategy for tracking a ground target with a UAV." 2008 IEEE/RSJ International Conference on Intelligent Robots and Systems. IEEE, 2008. (Year: 2008).*

(Continued)

*Primary Examiner* — Samah A Beg
(74) *Attorney, Agent, or Firm* — Anova Law Group, PLLC

(57) ABSTRACT

A method for determining position of a target includes determining at least two measurement points of the target, obtaining vector data of at least two direction vectors based on an imaging position of the target on an imaging system and parameter data of the imaging system, and determining a distance between the target and the imaging system according to the vector data and a current vertical height of the imaging system. Each of the at least two direction vectors is a vector from the imaging system to a corresponding one of the at least two measurement points.

22 Claims, 2 Drawing Sheets

(51) Int. Cl.
*G06K 9/00* (2006.01)
*G06T 7/246* (2017.01)
*G06T 7/70* (2017.01)
*B64C 39/02* (2006.01)
*G05D 1/00* (2006.01)
*G05D 1/12* (2006.01)
*G06T 7/20* (2017.01)
*G05D 1/10* (2006.01)

(52) U.S. Cl.
CPC ......... *G05D 1/0011* (2013.01); *G05D 1/0094* (2013.01); *G05D 1/12* (2013.01); *G06K 9/0063* (2013.01); *G06K 9/00664* (2013.01); *G06T 7/20* (2013.01); *G06T 7/246* (2017.01); *G06T 7/248* (2017.01); *G06T 7/70* (2017.01); *H04N 5/2328* (2013.01); *H04N 5/23299* (2018.08); *B64C 2201/127* (2013.01); *B64C 2201/141* (2013.01); *B64C 2201/145* (2013.01); *G06T 2207/10028* (2013.01); *G06T 2207/10032* (2013.01); *G06T 2210/12* (2013.01); *H04N 5/232* (2013.01)

(56) References Cited

U.S. PATENT DOCUMENTS

| | | | |
|---|---|---|---|
| 9,164,506 | B1 | 10/2015 | Zang et al. |
| 9,165,361 | B1 | 10/2015 | Ely |
| 9,367,067 | B2* | 6/2016 | Gilmore ............... G05D 1/0094 |
| 10,012,982 | B2 | 7/2018 | Kratz et al. |
| 10,429,487 | B1* | 10/2019 | Fowe .................... G01S 5/0284 |
| 2004/0054473 | A1 | 3/2004 | Shimomura |
| 2007/0070190 | A1 | 3/2007 | Yin et al. |
| 2007/0093945 | A1 | 4/2007 | Grzywna et al. |
| 2008/0054158 | A1 | 3/2008 | Ariyur et al. |
| 2008/0055413 | A1 | 3/2008 | Hayashi |
| 2009/0080701 | A1 | 3/2009 | Meuter et al. |
| 2010/0017046 | A1 | 1/2010 | Cheung et al. |
| 2010/0094460 | A1 | 4/2010 | Choi et al. |
| 2010/0179691 | A1 | 7/2010 | Gal et al. |
| 2010/0228406 | A1 | 9/2010 | Hamke et al. |
| 2011/0046817 | A1 | 2/2011 | Hamke et al. |
| 2011/0142286 | A1 | 6/2011 | Morriyama |
| 2011/0279682 | A1 | 11/2011 | Li et al. |
| 2011/0304736 | A1 | 12/2011 | Evans et al. |
| 2012/0189162 | A1 | 7/2012 | Sawada |
| 2012/0288152 | A1 | 11/2012 | Yano |
| 2012/0316680 | A1 | 12/2012 | Olivier, III et al. |
| 2013/0101230 | A1* | 4/2013 | Holeva .................. B66F 9/122 382/202 |
| 2013/0118528 | A1 | 5/2013 | Kim et al. |
| 2013/0345920 | A1 | 12/2013 | Duggan et al. |
| 2014/0163775 | A1 | 6/2014 | Metzler |
| 2015/0117716 | A1 | 4/2015 | Ursin et al. |
| 2015/0142211 | A1 | 5/2015 | Shehata et al. |
| 2015/0341603 | A1 | 11/2015 | Kasmir et al. |
| 2016/0054733 | A1 | 2/2016 | Hollida et al. |
| 2016/0078610 | A1* | 3/2016 | Rudd .................... G06T 7/0004 348/87 |
| 2016/0125249 | A1 | 5/2016 | Mei et al. |
| 2016/0127641 | A1 | 5/2016 | Gove |
| 2016/0304198 | A1 | 10/2016 | Jourdan |
| 2017/0070674 | A1 | 3/2017 | Thurow et al. |
| 2017/0106537 | A1 | 4/2017 | Chizeck et al. |
| 2018/0129212 | A1* | 5/2018 | Lee ........................ B64D 47/08 |
| 2018/0165815 | A1* | 6/2018 | Okada ..................... G06T 7/13 |
| 2019/0025858 | A1* | 1/2019 | Bar-Nahum ......... G08G 5/0013 |
| 2019/0156086 | A1* | 5/2019 | Plummer ................ G06T 5/006 |
| 2019/0265733 | A1* | 8/2019 | Zhou ...................... G05D 1/101 |
| 2019/0277645 | A1* | 9/2019 | Li ........................ G01C 21/3461 |

FOREIGN PATENT DOCUMENTS

| | | |
|---|---|---|
| CN | 101614816 A | 12/2009 |
| CN | 101769754 A | 7/2010 |
| CN | 101860732 A | 10/2010 |
| CN | 102087530 A | 6/2011 |
| CN | 102629385 A | 8/2012 |
| CN | 102902282 A | 1/2013 |
| CN | 202758243 U | 2/2013 |
| CN | 102955478 A | 3/2013 |
| CN | 102967305 A | 3/2013 |
| CN | 103149939 A | 6/2013 |
| CN | 103455797 A | 12/2013 |
| CN | 103530894 A | 1/2014 |
| CN | 103611324 A | 3/2014 |
| CN | 103822615 A | 5/2014 |
| CN | 103871075 A | 6/2014 |
| CN | 103914068 A | 7/2014 |
| CN | 104035446 A | 9/2014 |
| CN | 104197928 A | 12/2014 |
| CN | 104217417 A | 12/2014 |
| CN | 104299244 A | 1/2015 |
| CN | 104361770 A | 2/2015 |
| CN | 104537898 A | 4/2015 |
| CN | 204360218 U | 5/2015 |
| CN | 104714556 A | 6/2015 |
| CN | 104781781 A | 7/2015 |
| CN | 104786226 A | 7/2015 |
| CN | 104796611 A | 7/2015 |
| CN | 104820428 A | 8/2015 |
| CN | 104828256 A | 8/2015 |
| CN | 104834307 A | 8/2015 |
| CN | 104853104 A | 8/2015 |
| CN | 104899554 A | 9/2015 |
| CN | 105371818 A * | 3/2016 ............ G06T 7/521 |
| CN | 107102647 A * | 8/2017 |
| JP | H10105712 A | 4/1998 |
| JP | H10141891 A | 5/1998 |
| JP | 2001306144 A | 11/2001 |
| JP | 2003177120 A | 6/2003 |
| JP | 2004042884 A | 2/2004 |
| JP | 2004112144 A | 4/2004 |
| JP | 2004355105 A | 12/2004 |
| JP | 2008136171 A | 6/2008 |
| JP | 2010202178 A | 9/2010 |
| JP | 2011233149 A | 11/2011 |
| JP | 2012144250 A | 8/2012 |
| JP | 2013177120 A | 9/2013 |
| JP | 2014063411 A | 4/2014 |
| JP | 2014516816 A | 7/2014 |
| JP | 2014212479 A | 11/2014 |
| JP | 2014215196 A | 11/2014 |
| TW | 201235808 A | 9/2012 |
| WO | 2013051046 A1 | 4/2013 |
| WO | 2013139509 A1 | 9/2013 |
| WO | 2014118299 A1 | 8/2014 |
| WO | 2014200604 A2 | 12/2014 |
| WO | 2014200604 A3 | 3/2015 |
| WO | 2015105597 A2 | 7/2015 |
| WO | 2015105597 A3 | 10/2015 |
| WO | 2015105597 A4 | 12/2015 |

OTHER PUBLICATIONS

The World Intellectual Property Organization (WIPO) International Search Report for PCT/CN2015/100257 dated May 30, 2016 6 Pages. (including translation).
The World Intellectual Property Organization (WIPO) International Search Report and Written Opinion for PCT/CN2015/089594 dated Jun. 3, 2016 7 Pages.
"CN103149939A Translation", Jun. 2013. U.S. Appl. No. 15/396,022.
Syaril Azrad et al., Visual Servoing of an Autonomous Micro Air Vehicle for Ground Object Tracking, The 2009 IEEE/RSJ International Conference on Intelligent Robots and Systems, Oct. 2009, pp. 5321-5326.
The World Intellectual Property Organization (WIPO) International Search Report for PCT/CN2015/093459 dated Jun. 22, 2016.
The World Intellectual Property Organization (WIPO) International Search Report for PCT/CN2016/074830 dated Aug. 4, 2016.
Yu-Fei Zha, et al., Fast Visual Tracking with Spatial Phase Correlation, ACTA Photonica Sinica, vol. 44, No. 7, Jul. 2015.

(56) References Cited

OTHER PUBLICATIONS

Yaskawanews, Yaskawa Electric Corporation, Japan, Nov. 20, 2008, 14 pages, Winter 2008, No. 285 https://www.yaskawa.co.jp/wp-content/uploads/2015/01/285.pdf.

Motoman Operation Education Manual YRC / DX / NX Common, Motoman Engineer, Japan, Ring Co., Ltd., Dec. 2017, pp. 2-1, 2-4, 7-5, 13-11, 13-12.

Xiangjun Wang, et al., Ground Targets Location of UAV Using Vision Location Method, Infrared and Laser Engineering, Feb. 2014, pp. 615-619, vol. 43, No. 2, China Academic Journal Electronic Publishing House, China.

\* cited by examiner

METHOD AND DEVICE OF DETERMINING POSITION OF TARGET, TRACKING DEVICE AND TRACKING SYSTEM

CROSS REFERENCE

This application is a continuation application of International Application No. PCT/CN2015/100257, filed on Dec. 31, 2015, which claims priority to International Application No. PCT/CN2015/089594, filed on Sep. 15, 2015, entitled "SYSTEM AND METHOD FOR SUPPORTING SMOOTH TARGET FOLLOWING," the entire contents of both of which are hereby incorporated by reference.

TECHNICAL FIELD

The disclosure relates to target tracking, and more particularly to a method and device of determining position of a target, a tracking device, an unmanned aerial vehicle (UAV), a tracking system and a storage medium.

BACKGROUND OF THE DISCLOSURE

Visual tracking can be effected based on image information of a target. However, an attitude of an aerial camera can be different from an attitude of an unmanned aerial vehicle (UAV) as a stabilizing platform is used to carry the aerial camera. A velocity, position (e.g., latitude and longitude) or attitude angle, which is used to control the UAV, may not directly correspond to a position of the target which is a pixel in a captured image of the camera obtained from the image information. The target can be kept in the captured image using the visual tracking based on image information, however, it can be difficult to control the UAV to follow the target.

SUMMARY OF THE DISCLOSURE

The disclosure provides a method and device of determining position of a target, a tracking device, an unmanned aerial vehicle (UAV), a tracking system and a storage medium to an reduce an error and to improve a track effect in existing tracking method.

A first aspect of the disclosure provides a method of determining position of a target. The method can comprise: determining at least two measurement points of the target; obtaining vector data of at least two direction vectors based on an imaging position of the target on an imaging system and parameter data of the imaging system, each one of the at least two direction vectors being a vector from the imaging system to a respective one of the at least two measurement points; and determining a distance of the target according to the vector data and a current vertical height of the imaging system.

In some embodiments, the measurement points can include a top measurement point and a bottom measurement point of a bounding box of the target.

In some embodiments, the measurement points can include division points which equally divide a vertical height of the target.

In some embodiments, the measurement points can include image feature points of the target.

In some embodiments, the parameter data can comprise a focal length parameter, a calibration parameter and an attitude parameter of the imaging system.

In some embodiments, the imaging position of the target can comprise positions of the measurement points projected onto an image plane of the imaging system.

In some embodiments, the distance can comprise a real-time distance between the target and the imaging system.

In some embodiments, obtaining vector data of at least two direction vectors can comprise obtaining a direction vector group including a plurality of sets of direction vectors, each set of direction vectors comprising two direction vectors from among a plurality of direction vectors. In some embodiments, determining a distance of the target according to the vector data and a current vertical height of the imaging system can comprise: calculating a distance of the target based on each one of the plurality of sets of direction vectors, such that a set of distances including a plurality of distances is obtained; and determining the distance of the target by calculating a weighted average of the plurality of distances in the set of distances.

In some embodiments, the measurement points can be measurement points which equally divide a vertical height of the target. In some embodiments, the direction vector group can comprise a plurality of sets of direction vectors, each set of direction vectors comprising two direction vectors from the imaging system to the measurement points.

In some embodiments, determining the distance of the target by calculating a weighted average of the plurality of distances in the set of distances can comprise determining a weight of a distance according to an angle between a corresponding measurement point and a horizontal direction, a first weight corresponding to a first angle being less than a second weight corresponding to a second angle if the first angle is greater than the second angle.

In some embodiments, determining the distance of the target by calculating a weighted average of the plurality of distances in the set of distances can comprise determining a weight of a distance according to an angle between a corresponding measurement point and a horizontal direction, the weight being inversely proportional to cosine of the angle.

In some embodiments, determining the distance of the target by calculating a weighted average of the plurality of distances in the set of distances can comprise determining a weight of a distance according to an angle between a corresponding measurement point and a horizontal direction, the weight being inversely proportional to a square of cosine of the angle.

In some embodiments, obtaining vector data of at least two direction vectors can comprise obtaining the vector data of the direction vectors and normalizing the vector data.

In some embodiments, the method can further comprise determining a real-time measurement data of vertical height of the target according to the vector data and the current vertical height of the imaging system, comparing the real-time measurement data of vertical height with a preset vertical height, and determining that a current measurement result is inaccurate if a difference between the real-time measurement data of vertical height of the target and the preset vertical height exceeds a preset threshold.

In some embodiments, the preset vertical height can be a vertical height of the target measured in advance.

In some embodiments, the preset vertical height can be a vertical height of the target determined based on the measurement points, the vector data and the current vertical height of the imaging system in an initialization stage.

In some embodiments, after determining that a current measurement result is inaccurate, the method can further comprise determining at least two new measurement points of the target and determining a distance of the target based on the at least two new measurement points of the target.

In some embodiments, after determining that the current measurement result is inaccurate, the method can further comprise discarding a current image and determining a distance of the target based on a next image.

In some embodiments, after determining that the current measurement result is inaccurate, the method can further comprise correcting the current measurement result using the preset vertical height.

In some embodiments, correcting the current measurement result using the preset vertical height can comprise obtaining a first vector data of a direction vector of a first measurement point; determining a top position coordinate data and/or a bottom position coordinate data of the target according to the preset vertical height and the first vector data; and correcting a bounding box of the target based on the top and/or bottom position coordinate data.

In some embodiments, the first measurement point can be a top measurement point or a bottom measurement point of the bounding box of the target.

In some embodiments, the method can further comprise controlling a flight parameter of an unmanned aerial vehicle based on the distance of the target.

A further aspect of the disclosure provides a device of determining position of a target. The device can comprise a measurement point determining module configured to determine at least two measurement points of the target; a direction vector obtaining module configured to obtain vector data of at least two direction vectors based on an imaging position of the target on an imaging system and parameter data of the imaging system, each one of the at least two direction vectors being a vector from the imaging system to a respective one of the at least two measurement points; and a distance determining module configured to determine a distance of the target according to the vector data and a current vertical height of the imaging system.

In some embodiments, the measurement points can include a top measurement point and a bottom measurement point of a bounding box of the target.

In some embodiments, the measurement points can include division points which equally divide a vertical height of the target.

In some embodiments, the measurement points can include image feature points of the target.

In some embodiments, the parameter data can comprise a focal length parameter, a calibration parameter and an attitude parameter of the imaging system.

In some embodiments, the imaging position can comprise positions of the measurement points projected onto an image plane of the imaging system.

In some embodiments, the distance of the target can comprises a real-time distance between the target and the imaging system.

In some embodiments, the direction vector obtaining module can be configured to obtain a direction vector group including a plurality of sets of direction vectors, each set of direction vectors comprising two direction vectors from among a plurality of direction vectors. In some embodiments, the distance determining module can comprise: a calculation unit configured to calculate a distance of the target based on each one of the plurality of sets of direction vectors, such that a set of distances including a plurality of distances is obtained; and a first determining unit configured to determine the distance of the target by calculating a weighted average of the plurality of distances in the set of distances.

In some embodiments, the measurement points can be measurement points which equally divide a vertical height of the target. In some embodiments, the direction vector group can comprise a plurality of sets of direction vectors, each set of direction vectors comprising two direction vectors from the imaging system to the measurement points.

In some embodiments, the first determining unit can be configured to determine a weight of a distance according to an angle between a corresponding measurement point and a horizontal direction, a first weight corresponding to a first angle being less than a second weight corresponding to a second angle if the first angle is greater than the second angle.

In some embodiments, the first determining unit can be configured to determine a weight of a distance according to an angle between a corresponding measurement point and a horizontal direction, the weight being inversely proportional to cosine of the angle.

In some embodiments, the first determining unit can be configured to determine a weight of a distance according to an angle between a corresponding measurement point and a horizontal direction, the weight being inversely proportional to a square of cosine of the angle.

In some embodiments, the direction vector obtaining module can be configured to obtain the vector data of the direction vectors and normalize the vector data.

In some embodiments, the device of determining position of a target can further comprise a comparison module configured to determine a real-time measurement data of vertical height of the target according to the vector data and the current vertical height of the imaging system, compare the real-time measurement data of vertical height with a preset vertical height, and determine that a current measurement result is inaccurate if a difference between the real-time measurement data of vertical height of the target and the preset vertical height exceeds a preset threshold.

In some embodiments, the preset vertical height can be a vertical height of the target measured in advance.

In some embodiments, the preset vertical height can be a vertical height of the target determined based on the measurement points, the vector data and the current vertical height of the imaging system in an initialization stage.

In some embodiments, the device of determining position of a target can further comprise a first remeasurement module configured to, once the current measurement result is determined as inaccurate, determine at least two new measurement points of the target and determine a distance of the target based on the at least two new measurement points of the target.

In some embodiments, the device of determining position of a target can further comprise a second remeasurement module configured to, once the current measurement result is determined as inaccurate, discard a current image and determine a distance of the target based on a next image.

In some embodiments, the device of determining position of a target can further comprise a correction module configured to, once the current measurement result is determined as inaccurate, correct the current measurement result using the preset vertical height.

In some embodiments, the correction module can comprise an obtaining unit configured to obtain a first vector data of a direction vector of a first measurement point; and a second determining unit configured to determine a top position coordinate data and/or a bottom position coordinate data of the target according to the preset vertical height and the first vector data; and a correcting unit configured to correct a bounding box of the target based on the top and/or bottom position coordinate data.

In some embodiments, the first measurement point can be a top measurement point or a bottom measurement point of the bounding box of the target.

A further aspect of the disclosure provides a tracking device. The tracking device can comprise a camera, a carrier, a communication device and the device of determining position of a target of any aspect of the disclosure.

In some embodiments, the tracking device can be used in an aerial vehicle for aerial photography, a robot or a movable device.

A further aspect of the disclosure provides an unmanned aerial vehicle. The unmanned aerial vehicle can comprising the device of determining position of a target of any aspect of the disclosure.

A further aspect of the disclosure provides a tracking system. The tracking system can comprise a control unit configured to implement the method of determining position of a target of any aspect of the disclosure.

A further aspect of the disclosure provides a storage medium. The storage medium can store instructions configured to implement the method of determining position of a target of any aspect of the disclosure.

With the method and device of determining position of a target in accordance with the disclosure, at least two measurement points of the target can be determined, vector data of at least two direction vectors can be obtained based on an imaging position of the target on an imaging system and parameter data of the imaging system, and a distance of the target can be determined according to the vector data and a current vertical height of the imaging system. The position of the target can be determined in real-time based on image information captured by the imaging system using computer vision. An error in a bounding box which encloses the target can be detected during target tracking, such that a satisfactory position information of the target can be obtained even if an error is found in the tracking algorithm. Therefore, a robustness and stability of the system and a user experience of automatic visual tracking can be improved. The disclosure also provides a tracking device, an unmanned aerial vehicle (UAV), a tracking system and a storage medium.

BRIEF DESCRIPTION OF THE DRAWINGS

Embodiments of the disclosure will be described with reference to the accompanying drawings. It will be apparent to those skilled in the art that, the drawings merely illustrate some embodiments of the disclosure, and other drawings can be conceived without any inventive effort.

DETAILED DESCRIPTION OF THE DISCLOSURE

A relative position of a target is required to control an unmanned aerial vehicle (UAV) to automatically track the target. The disclosure provides a method and a device of determining position of a target, a tracking device, an unmanned aerial vehicle, a tracking system and a storage medium.

A better understanding of the disclosure will be obtained by reference to the following detailed description that sets forth illustrative embodiments with reference to the drawings. It will be apparent that, the embodiments described herein are merely provided by way of example only. Those skilled in the art can conceive various embodiments in light of those embodiments disclosed herein without inventive efforts, and all these embodiments are within the scope of the disclosure.

Figure 1:
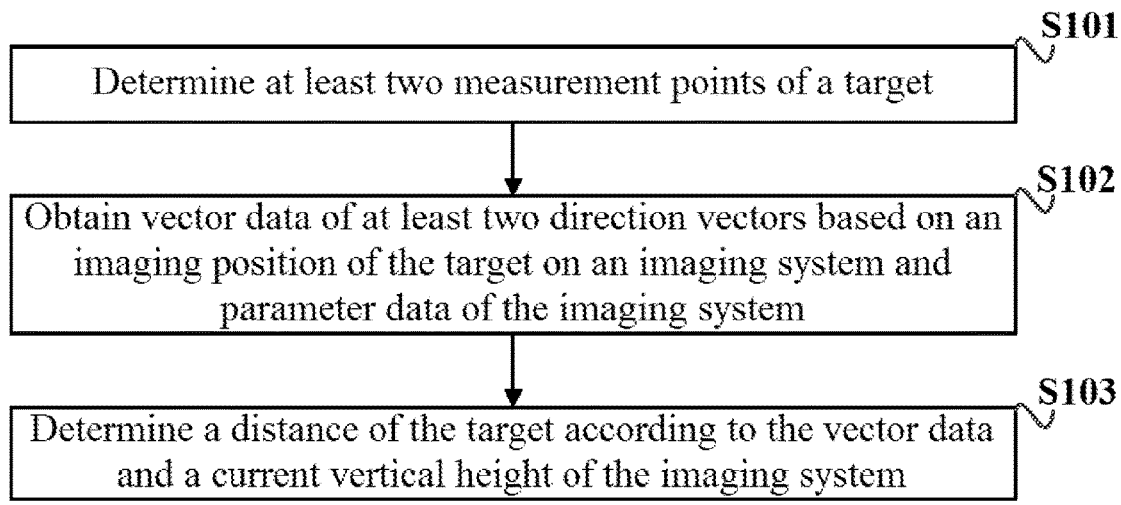
FIG. 1 shows a flowchart of a method of determining position of a target in accordance with an embodiment of the disclosure.

FIG. 1 shows a flowchart of a method of determining position of a target in accordance with an embodiment of the disclosure. In some embodiments, the method can comprise steps S101 to S103.

In step S101, at least two measurement points of the target can be determined.

In some embodiments, the measurement points can be a top measurement point and a bottom measurement point of a bounding box of the target. For instance, the top measurement point and the bottom measurement point can be a top center measurement point and a bottom center measurement point of the bounding box, respectively. It will be appreciated that, the bounding box can be a minimum rectangle which encloses the target. In some embodiments, two the measurement points can be provided.

In some embodiments, the measurement points can be n (n≥2) division points which equally divide a vertical height of the target. For instances, the measurement points can comprise n+1 measurement points.

Optionally, the measurement points can comprise image feature points of the target. In some instances, two or more measurement points can be used.

In step S102, vector data of at least two direction vectors can be obtained based on an imaging position of the target on an imaging system and a parameter data of the imaging system. The direction vector can be a vector from the imaging system to the measurement point.

In some embodiments, the parameter data of the imaging system can comprise a focal length parameter, a calibration parameter and an attitude parameter of the imaging system. The imaging position of the target on the imaging system can be positions of the measurement points projected onto an image plane of the imaging system. The direction vector can be a vector from an optical center of the imaging system to the measurement points.

In step S103, a distance of the target can be determined according to the vector data and a current vertical height of the imaging system.

In some embodiments, the distance can be a real-time distance between the target and the imaging system.

It will be appreciated that, the method of the disclosure can be used in an UAV system. In some embodiments, the imaging system can be onboard the UAV to capture an image of the target in real-time. The current vertical height of the imaging system can be a current vertical height of the UAV, a value of which can be obtained by an inertial sensor or a global positioning system (GPS) onboard the UAV. Alternatively, the imaging system can be provided to various other carriers to track a target, and the vertical height of the imaging system can be obtained using various measuring means. A measurement of the height is not thus limited.

The distance of the target can be calculated through a coordinate system transformation and trigonometry based on the current vertical height, the focal length parameter, the calibration parameter and the attitude parameter of the imaging system and the direction vectors.

The distance of the target thus obtained can be used in controlling the imaging system to track a target. For instance, a flight of a UAV provided with the imaging system can be controlled, such that a distance from the UAV to the target is within a preset tracking range.

In some instances, a current velocity of the target can be calculated by obtaining the distance of the target over a period of time, such that a velocity of the imaging system can be regulated.

In some embodiments, a flight parameter such as a yaw angle of the UAV can be regulated according to a change of the target in an X axis and a Y axis.

In the method of determining position of a target in accordance with the disclosure, at least two measurement points of the target can be determined, vector data of at least two direction vectors can be obtained based on an imaging position of the target on an imaging system and parameter data of the imaging system, and a distance of the target can be determined according to the vector data and a current vertical height of the imaging system. The position of the target can be determined in real-time based on image information captured by the imaging system using computer vision. An error in a bounding box which encloses the target can be detected during target tracking, such that a satisfactory position information of the target can be obtained even if an error is found in the tracking algorithm. Therefore, a robustness and stability of the system and a user experience of automatic visual tracking can be improved.

Figure 2:
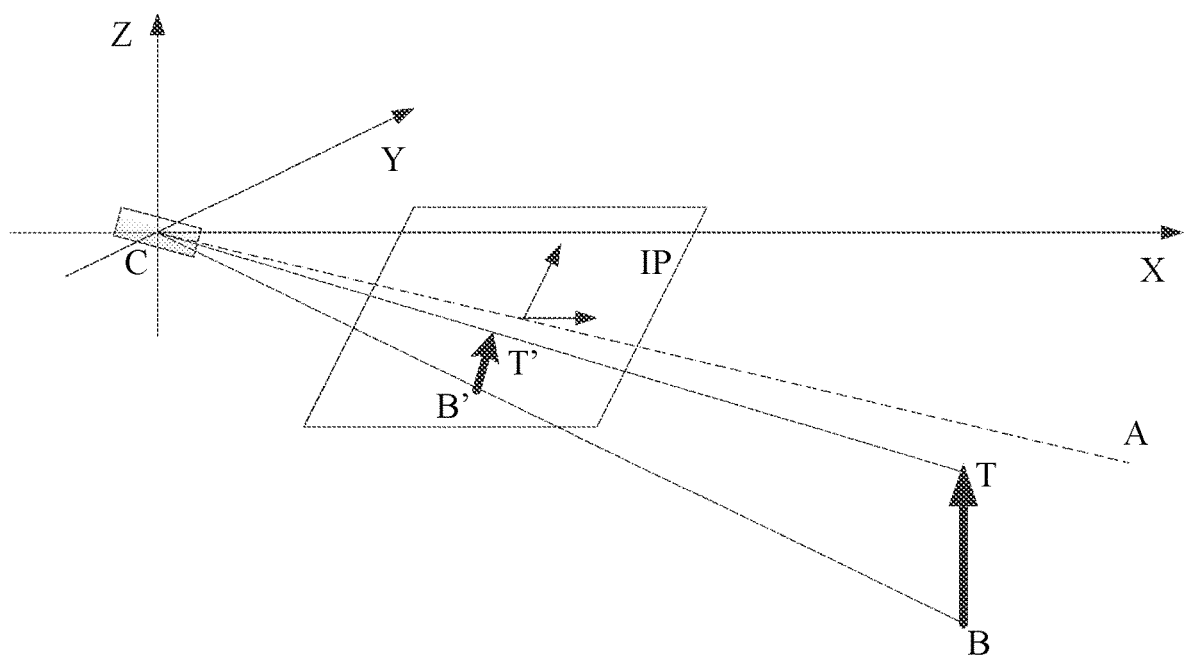
FIG. 2 shows a calculation in a method of determining position of a target in accordance with an embodiment of the disclosure.

The method of determining position of a target in accordance with the disclosure will be described where the measurement points are a top measurement point and a bottom measurement point of the bounding box of the target. FIG. 2 shows a calculation in a method of determining position of a target in accordance with an embodiment of the disclosure. Label C refers to an optical center of an imaging system, label CA refers to an optical axis of the imaging system, and label TB refers to a target. A first coordinate system XYZ having the optical center C of the imaging system as the origin can be established. Coordinate of point B is ($x_b$, $y_b$, $z_b$), and coordinate of point T is ($x_t$, $y_t$, $z_t$). Label IP refers to an image plane of the imaging system, on which a second coordinate system UV can be established. Label T'B' refers to an imaging of the target TB on the image plane, where coordinate of point B' is ($u_b$, $v_b$) and coordinate of T' is ($u_t$, $v_t$).

A direction vector $\vec{T}$ from the optical center C of the imaging system to the top measurement point T of the target can be represented as $$\vec{T} = \begin{pmatrix} x_t \\ y_t \\ z_t \end{pmatrix} \sim RK^{-1} \begin{pmatrix} u_t \\ v_t \\ 1 \end{pmatrix},$$

and a direction vector $\vec{B}$ from the optical center C of the imaging system to the bottom measurement point B of the target can be represented as $$\vec{B} = \begin{pmatrix} x_b \\ y_b \\ z_b \end{pmatrix} \sim RK^{-1} \begin{pmatrix} u_b \\ v_v \\ 1 \end{pmatrix}$$

where K is an intrinsic matrix of the imaging system, and R is a rotation matrix.

A horizontal distance between the target and the imaging system can be $$d = -\frac{h_c}{z_b} * P_b,$$

and a real-time measurement data of vertical height of the target can be $$h_o = h_c + \frac{z_t d}{P_t},$$

where $P_b = \sqrt{x_b^2 + y_b^2}$, and $P_t = \sqrt{x_t^2 + y_t^2}$.

From above equations, the horizontal distance between the target and the imaging system and the real-time measurement data of vertical height of the target can be calculated through a coordinate system transformation and trigonometry based on the current vertical height, the focal length parameter, the calibration parameter and the attitude parameter of the imaging system and the obtained direction vectors $\vec{T}$ and $\vec{B}$.

In some embodiments, a relative position relationship between the target and the imaging system can be determined based on a size and a position of the bounding box which encloses the target obtained using a tracking algorithm, such that an aerial vehicle can be controlled to track the target. The method of determining position of a target may rely on a detection accuracy of the tracking algorithm. However, the bounding box may be subject to an error during the target tracking due to various reasons including a reflection, underexposure or overexposure of images or an obstruction of the target. The error in the bounding box can lead to a large error in the measured position, resulting in an inferior target tracking of the aerial vehicle.

In some embodiments, the measurements points can be division points which equally divide the vertical height of the target into equal segments or image feature points of the target. With the method discussed in the above embodiments, a vertical distance between any two measurement points of the target can be calculated. Subsequently, the real-time measurement data of vertical height of the target can be calculated based on a relationship between the measurement points and the vertical height of the target. For instance, in case the measurement points are division points which divide the vertical height of the target into two equal segments, the real-time measurement data of vertical height of the target can be obtained by simply multiplying a calculated vertical distance between the measurement points by 2.

With the embodiments discussed hereinabove, in addition to a top point and a bottom point on the bounding box of the target, the distance of the target can be determined based on measurement points such as division points or image feature points of the target. Therefore, the distance of the target can be obtained even if the top or bottom of the target is obstructed, such that a continuous tracking can be effected to improve the target tracking.

In some embodiments, more than two measurement points of the target can be used in target tracking. A direction vector group including a plurality of sets of direction vectors can be obtained, each set of direction vectors comprising two direction vectors from among a plurality of direction vectors. The embodiments where more than two measurement points of the target are used will be described.

In some embodiments, a plurality of measurement points can be determined along a height of the target with a height interval, and a plurality of direction vectors can be formed by connecting the measurement points with the optical center of the imaging system. A plurality of sets of direction vectors can be obtained, each set of direction vectors comprising two direction vectors from among a plurality of direction vectors.

In this way, a distance of the target can be calculated from each one of the plurality of sets of direction vectors, such that a set of distances can be obtained. The distance of the target can be determined by calculating a weighted average of the plurality of distances in the set of distances.

Figure 3:
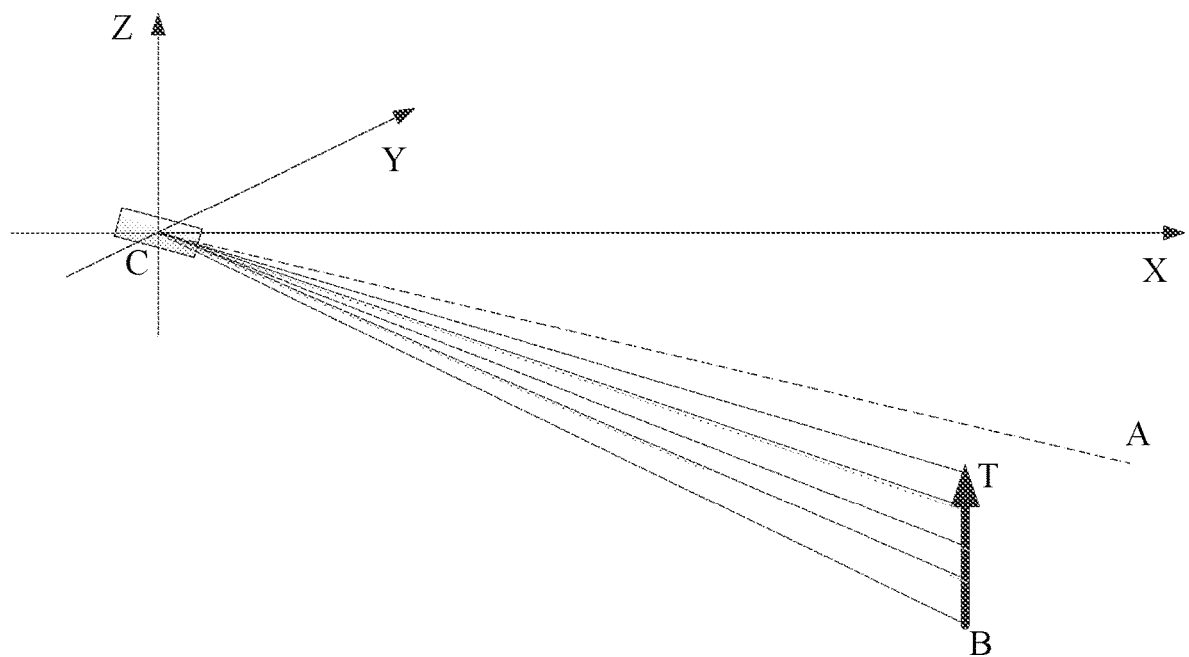
FIG. 3 shows a calculation in a method of determining position of a target in accordance with another embodiment of the disclosure.

FIG. 3 schematically shows a method of determining position of a target in accordance with another embodiment of the disclosure. In some embodiment, the measurement points can be division points which equally divide the vertical height of the target. Optionally, the measurement points can be image feature points of the target. A plurality of sets of direction vectors can be obtained each comprising two direction vectors from among a plurality of direction vectors.

In some embodiments, the process of calculating the weighted average of the plurality of distances in the set of distances can comprise determining a weight of a distance according to an angle between a direction vector corresponding to a corresponding measurement point and a horizontal direction. For instance, a first weight corresponding to a first angle can be less than a second weight corresponding to a second angle if the first angle is greater than the second angle. In other words, a larger angle between a measurement point and the horizontal direction can correspond to a smaller weight for a corresponding distance.

In the described process of calculating the weighted average of the plurality of distances in the set of distances, a weight of a distance can be determined according to the angle between the corresponding measurement point and the horizontal direction. In some instances, the weight can be inversely proportional to cosine of the angle. Optionally, the weight can be inversely proportional to a square of cosine of the angle. Various relationship between the weight and the angle between the corresponding measurement point and the horizontal direction can be possible, providing that a larger angle between a measurement point and the horizontal direction correspond to a smaller weight of a corresponding distance.

In some embodiments where the weight is determined based on a square of cosine of an angle between the corresponding measurement point and the horizontal direction, a normalization can be performed as the sum of square of cosine of all the angles is not equal to 1. For instanced, the normalization can be performed by dividing a weight, which is determined based on a square of cosine of an angle between the corresponding measurement point and the horizontal direction, by a sum of a square of cosine of all the angles.

The position of the target, which is obtained by assigning a weigh, can be stable and reliable to further reduce a calculation error.

In some embodiments, the method can further comprise, after obtaining the vector data of the direction vectors, normalizing the vector data.

In some embodiments, the method of determining position of a target can further comprise, after obtaining a real-time measurement data of vertical height, determining the real-time measurement data of vertical height of the target according to the vector data and the current vertical height of the imaging system, comparing the real-time measurement data of vertical height with a preset vertical height, and determining that a current measurement result is inaccurate if a difference between the real-time measurement data of vertical height of the target and the preset vertical height exceeds a preset threshold.

In some instances, the preset vertical height can be a relatively accurate vertical height of the target which is determined using the method of the disclosure in an initialization stage. Since a measurement result can be accurate and the target can be at or near the ground during the initialization stage, the vertical height thus determined can be used as the preset vertical height of the target. Optionally, the preset vertical height of the target can be obtained in advance. Optionally, the preset vertical height of the target can be obtained by other real-time measurement methods.

In some embodiments, the vertical height of the target can be a fixed value which does not change over time. Therefore, a measurement result can be determined as inaccurate if a difference between a currently measured real-time measurement data of vertical height and the preset vertical height exceeds the preset threshold.

In some embodiments, the method can further comprise, after determining that a current measurement result is inaccurate, determining a distance of the target once again. In some instances, at least two new measurement points of the target can be determined from a current image, and the method of determining position of a target in accordance with any one of embodiments as discussed hereinabove can be performed. Optionally, the current image can be discarded, and the method can be performed to a next image to determine a distance of the target.

In some embodiments, the method can further comprise, after determining that a current measurement result is inaccurate, correcting the current measurement result using the preset vertical height.

In some embodiments, the process of correcting the current measurement result using the preset vertical height can comprise obtaining a first vector data of a direction vector of a first measurement point; determining a top position coordinate data and/or a bottom position coordinate data of the target according to the preset vertical height and the first vector data; and correcting the bounding box of the target based on the top and/or bottom position coordinate data.

In some instances, the first measurement point can be a top measurement point or a bottom measurement point of the bounding box of the target. For example, a theoretical value of the direction vector of the top of the target at the present time can be calculated according to the preset vertical height and the vector data of the direction vector of the top measurement point of the target at the present time. Subsequently, a current measurement result can be corrected through a comparison between the theoretical value of the direction vector of the top of the target and the top direction vector of the target calculated by the tracking algorithm.

An error in target tracking can be effectively monitored to thereby obtain a relatively accurate position of the target by correcting a real-time measurement, the real-time measurement being corrected by comparing the real-time measurement with the theoretical value.

It will be appreciated that, the method provided by the disclosure can be applied to aerial vehicles, robots, and various movable devices having an imaging capturing function and a smart system.

It will be appreciated that, the method provided by the disclosure can be implemented as an algorithm. The algorithm can be effected on a smart device which is capable of controlling an aerial photography aircraft and obtaining images. For example, the smart device can comprise a smart remote controller, a cell phone, a tablet or a PC. In some instances, the algorithm can be effected as a module onboard an aerial photography aircraft.

A device of determining position of a target in accordance with embodiments of the disclosure will be described. The device of determining position of a target can substantially correspond to the method of determining position of a target as discussed hereinabove.

Figure 4:
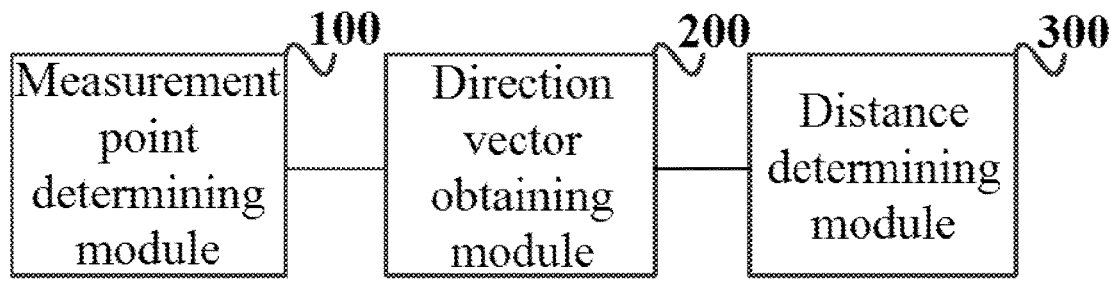
FIG. 4 shows a block diagram of a configuration of a device of determining position of a target in accordance with an embodiment of the disclosure.

FIG. 4 shows a block diagram of a configuration of a device of determining position of a target in accordance with an embodiment of the disclosure. The device of determining position of a target as shown in FIG. 4 can comprise a measurement point determining module 100, a direction vector obtaining module 200 and a distance determining module 300. The measurement point determining module 100 can be configured to determine at least two measurement points of the target. The direction vector obtaining module 200 configured to obtain vector data of at least two direction vectors based on an imaging position of the target on an imaging system and a parameter data of the imaging system. The direction vector can be a vector from the imaging system to the measurement point. The distance determining module 300 configured to determine a distance of the target according to the vector data and current vertical height of the imaging system.

In some embodiments, the measurement points used by the device of determining position of a target can be a top measurement point and a bottom measurement point of a bounding box of the target.

In some embodiments, the measurement points used by the device of determining position of a target can be division points which equally divide a vertical height of the target.

In some embodiments, the measurement points used by the device of determining position of a target can be image feature points on the target.

In some embodiments, the parameter data used by the device of determining position of a target can comprise a focal length parameter, a calibration parameter and an attitude parameter of the imaging system.

In some embodiments, the imaging position used by the device of determining position of a target can comprise a position of the measurement points projected onto an image plane of the imaging system.

In some embodiments, the distance determined by the device of determining position of a target can comprise a real-time distance between the target and the imaging system.

In some embodiments, the direction vector obtaining module 200 in the device of determining position of a target can be configured to obtain a direction vector group including a plurality of sets of direction vectors, each set of direction vectors comprising two direction vectors from among a plurality of direction vectors.

The distance determining module 300 can comprise a calculation unit configured to calculate a distance of the target from each one of the plurality of sets of direction vectors, such that a set of distances can be obtained; and a first determining unit configured to determine the distance of the target by calculating a weighted average of the plurality of distances in the set of distances.

In some embodiments, the measurement points used by the device of determining position of a target can be division points which equally divide the vertical height of the target, and the plurality of sets of direction vectors can comprise a plurality vectors from the imaging system to the measurement points.

In some embodiments, the first determining unit in the device of determining position of a target can be configured to determine a weight of a distance according to an angle between the direction vector corresponding to the corresponding measurement point and a horizontal direction. For instance, a first weight corresponding to a first angle can be less than a second weight corresponding to a second angle if the first angle is greater than the second angle.

In some embodiments, the first determining unit in the device of determining position of a target can be configured to determine a weight of a distance according to the angle between the corresponding measurement point and the horizontal direction. In some instances, the weight can be inversely proportional to cosine of the angle.

In some embodiments, the first determining unit in the device of determining position of a target can be configured to determine a weight of a distance according to the angle between the corresponding measurement point and the horizontal direction. In some instances, the weight can be inversely proportional to a square of cosine of the angle.

In some embodiments, the direction vector obtaining module 200 in the device of determining position of a target can be configured to obtain the vector data of the direction vectors and normalize the vector data.

In some embodiments, the device of determining position of a target can further comprise a comparison module configured to determine the real-time measurement data of vertical height of the target according to the vector data and the current vertical height of the imaging system, compare the real-time measurement data of vertical height with a preset vertical height, and determine that a current measurement result is inaccurate if a difference between the real-time measurement data of vertical height and the preset vertical height exceeds a preset threshold.

In some embodiments, in the device of determining position of a target, the preset vertical height can be a vertical height of the target obtained in advance.

In some embodiments, in the device of determining position of a target, the preset vertical height can be a vertical height of the target determined from the measurement points, corresponding vector data and the current vertical height of the imaging system in an initialization stage.

In some embodiments, the device of determining position of a target can further comprise a first remeasurement module configured to, if the current measurement result is determined as inaccurate, determine at least two new measurement points of the target and determine a distance of the target once again.

Alternatively, the device of determining position of a target can further comprise a second remeasurement module configured to, if the current measurement result is determined as inaccurate, determine a distance of the target based on a next image.

In some embodiments, the device of determining position of a target can further comprise a correction module configured to, if the current measurement result is determined as inaccurate, correct the current measurement result using the preset vertical height.

In some embodiments, in the device of determining position of a target, the correction module can comprise: an obtaining unit configured to obtain a first vector data of a direction vector of a first measurement point; a second determining unit configured to determine a top position coordinate data and/or a bottom position coordinate data of the target according to the preset vertical height and the first vector data; and a correcting unit configured to correct the bounding box of the target based on the top and/or bottom position coordinate data.

In some embodiments, in the device of determining position of a target, the first measurement point can be a top measurement point or a bottom measurement point of the bounding box of the target.

With the device of determining position of a target in accordance with the disclosure, at least two measurement points of the target can be determined, vector data of at least two direction vectors can be obtained based on an imaging position of the target on an imaging system and parameter data of the imaging system, and a distance of the target can be determined according to the vector data and a current vertical height of the imaging system. The position of the target can be determined in real-time based on image information captured by the imaging system using computer vision. An error in a bounding box which encloses the target can be detected during target tracking, such that a satisfactory position information of the target can be obtained even if an error is found in the tracking algorithm. Therefore, a robustness and stability of the system and a user experience of automatic visual tracking can be improved.

A further aspect of the disclosure provides a tracking device comprising a camera, a carrier, a communication device and the device of determining position of a target in accordance with any embodiment as described hereinabove.

The tracking device can be used in an aircraft for aerial photography, a robot or other movable devices.

For instance, the tracking device can be used in an aircraft for aerial photography. A stable position information of a target can be calculated from a captured image based on a flight altitude, a camera attitude and parameter data. The calculation can be quick and simple, making it suitable for an UAV follow-up shooting system having a high demand on real-time performance. A position feedback with small delay can be provided to enable UAV to track the target.

A further aspect of the disclosure provides an unmanned aerial vehicle (UAV) comprising the device of determining position of a target in accordance with any embodiment as described hereinabove.

A further aspect of the disclosure provides a tracking system comprising a control unit configured to perform the steps in the method of determining position of a target in accordance with the disclosure.

A further aspect of the disclosure provides a storage medium for storing instructions configured to perform the steps in the method of determining position of a target in accordance with the disclosure.

The embodiments in the specification are described in a progressive way, in which emphasis of each one of the embodiments is given on the difference from other embodiments. Identical or similar parts among various embodiments can be apparent with cross-reference among the embodiments. The device as disclosed in some embodiments are described in a brief manner since they correspond to the methods described in other embodiments and can be apparent with reference to corresponding parts of the methods.

Those skilled in the art will appreciate that, the units and steps of the algorithms described in the embodiments disclosed herein can be implemented in electronic hardware, computer software, or a combination thereof. A general description of components and steps of the embodiments has been provided above in terms of their functionalities in order to clearly illustrate the interchangeability between hardware and software. Whether the functionalities are to be implemented in hardware or software depends on specific applications and design constraints of the technical solution. Different methods can be employed by those skilled in the art for any specific application so as to implement the described functionalities, and such implementation should not be considered as beyond the scope of the present disclosure.

The methods and the steps of the algorithms described in the embodiments disclosed herein can be implemented directly in hardware, in software modules executed by a processor, or a combination thereof. The software modules can be provided in a random access memory (RAM), a memory, a read-only memory (ROM), an electrically programmable read-only memory (EPROM), an electrically erasable programmable read-only memory (EEPROM), a register, a hard drive, a CD-ROM, or any other forms of storage media known in the art.

A method and a device of determining position of a target and a tracking device, an unmanned aerial vehicle, a tracking system and a storage medium are provided in detail, all in accordance with the present disclosure. The principle and implementation of the disclosure are illustrated herein by way of examples merely for the purpose of facilitating an understanding of the method of the disclosure and the key concept thereof. For an ordinary skilled in the art, variations and modifications can be made to the present disclosure in accordance with the spirit of the disclosure. All these variations and modifications fall into the scope of the disclosure.

What is claimed is:

1. A method for determining position of a target comprising:
    determining at least two measurement points of the target;
    obtaining vector data of at least two direction vectors based on an imaging position of the target on an imaging system and parameter data of the imaging system, each of the at least two direction vectors being a vector from the imaging system to a corresponding one of the at least two measurement points; and
    determining a distance between the target and the imaging system according to the vector data and a current vertical height of the imaging system.

2. The method of claim 1, wherein:
    the at least two measurement points include three or more measurement points,
    obtaining the vector data of the at least two direction vectors comprises obtaining a plurality of sets of direction vectors, each set of direction vectors comprising two direction vectors each corresponding to one of the three or more measurement points, and
    determining the distance according to the vector data and the current vertical height of the imaging system comprises:
        calculating a candidate distance between the target and the imaging system based on each one of the plurality of sets of direction vectors, to obtain a set of candidate distances; and
        determining the distance by calculating a weighted average of the set of candidate distances.

3. The method of claim 2, wherein:
the three or more measurement points equally divide a vertical height of the target, and
each of the two direction vectors in a set of direction vectors is from the imaging system to one of the three or more measurement points.

4. The method of claim 2, wherein determining the distance by calculating the weighted average of the set of candidate distances comprises:
determining weights of the candidate distances, a candidate distance having a higher weight if an angle corresponding to the candidate distance has a greater value.

5. The method of claim 4, wherein:
the angle corresponding to the candidate distance is an angle between one of the direction vectors corresponding to the candidate distance and a horizontal direction, and
the weight is inversely proportional to cosine of the angle or a square of cosine of the angle.

6. The method of claim 1, wherein obtaining the vector data comprises:
obtaining the vector data of the direction vectors and normalizing the vector data.

7. The method of claim 1, further comprising:
determining a real-time measurement of a vertical height of the target according to the vector data and the current vertical height of the imaging system,
comparing the real-time measurement of the vertical height of the target with a preset vertical height, and
determining that a current measurement result is inaccurate if a difference between the real-time measurement of the vertical height of the target and the preset vertical height exceeds a preset threshold.

8. The method of claim 7, wherein the preset vertical height is:
a vertical height of the target measured in advance, or
a vertical height of the target determined based on the measurement points, the vector data, and the current vertical height of the imaging system in an initialization stage.

9. The method of claim 7, further comprising, after determining that the current measurement result is inaccurate, performing at least one of:
determining at least two new measurement points of the target and determining a distance of the target based on the at least two new measurement points of the target,
discarding a current image and determining a distance of the target based on a next image, or
correcting the current measurement result using the preset vertical height.

10. The method of claim 9, wherein correcting the current measurement result using the preset vertical height comprises:
obtaining first vector data of a direction vector of a first measurement point;
determining top position coordinate data and/or bottom position coordinate data of the target according to the preset vertical height and the first vector data; and
correcting a bounding box of the target based on the top and/or bottom position coordinate data.

11. The method of claim 1, further comprising:
controlling a flight parameter of an unmanned aerial vehicle based on the distance.

12. A device for determining position of a target comprising:
a processor; and
a memory coupled to the processor and storing instructions that, when executed by the processor, cause the processor to:
determine at least two measurement points of the target;
obtain vector data of at least two direction vectors based on an imaging position of the target on an imaging system and parameter data of the imaging system, each of the at least two direction vectors being a vector from the imaging system to a corresponding one of the at least two measurement points; and
determine a distance between the target and the imaging system according to the vector data and a current vertical height of the imaging system.

13. The device of claim 12, wherein:
the at least two measurement points include three or more measurement points, and
the instructions further cause the processor to:
obtain the vector data of the at least two direction vectors by obtaining a plurality of sets of direction vectors, each set of direction vectors comprising two direction vectors each corresponding to one of the three or more measurement points, and
determine the distance by:
calculating a candidate distance between the target and the imaging system based on each one of the plurality of sets of direction vectors, to obtain a set of candidate distances; and
calculating a weighted average of the set of candidate distances as the distance.

14. The device of claim 13, wherein:
the three or more measurement points equally divide a vertical height of the target, and
each of the two direction vectors in a set of direction vectors is from the imaging system to one of the three or more measurement points.

15. The device of claim 13, wherein the instructions further cause the processor to:
determine weights of the candidate distances, a candidate distance having a higher weight if an angle corresponding to the candidate distance has a greater value.

16. The device of claim 15, wherein:
the angle corresponding to the candidate distance is an angle between one of the direction vectors corresponding to the candidate distance and a horizontal direction, and
the weight is inversely proportional to cosine of the angle or a square of cosine of the angle.

17. The device of claim 12, wherein the instructions further cause the processor to:
normalize the vector data.

18. The device of claim 12, wherein the instructions further cause the processor to:
determine a real-time measurement of a vertical height of the target according to the vector data and the current vertical height of the imaging system,
compare the real-time measurement of the vertical height of the target with a preset vertical height, and
determine that a current measurement result is inaccurate if a difference between the real-time measurement of the vertical height of the target and the preset vertical height exceeds a preset threshold.

19. The device of claim 18, wherein the preset vertical height is:
a vertical height of the target measured in advance, or
a vertical height of the target determined based on the measurement points, the vector data, and the current vertical height of the imaging system in an initialization stage.

20. The device of claim 18, wherein the instructions further cause the processor to perform at least one of:
determining at least two new measurement points of the target and determining a distance of the target based on the at least two new measurement points of the target,
discarding a current image and determining a distance of the target based on a next image, or
correcting the current measurement result using the preset vertical height.

21. The device of claim 20, wherein the instructions further cause the processor to correct the current measurement result by:
obtaining first vector data of a direction vector of a first measurement point;
determining top position coordinate data and/or bottom position coordinate data of the target according to the preset vertical height and the first vector data; and
correcting a bounding box of the target based on the top and/or bottom position coordinate data.

22. A tracking device comprising:
a camera;
a carrier;
a communication device; and
a device for determining position of a target comprising:
a processor; and
a memory coupled to the processor and storing instructions that, when executed by the processor, cause the processor to:
determine at least two measurement points of the target;
obtain vector data of at least two direction vectors based on an imaging position of the target on an imaging system and parameter data of the imaging system, each of the at least two direction vectors being a vector from the imaging system to a corresponding one of the at least two measurement points; and
determine a distance between the target and the imaging system according to the vector data and a current vertical height of the imaging system,
wherein the tracking device is configured to be used in an aerial vehicle for aerial photography, a robot, or a movable device.

* * * * *